Oct. 8, 1968   E. T. YOUNG   3,404,569
FLOWMETER MOUNTING ARRANGEMENT
Filed June 3, 1966   2 Sheets-Sheet 1

INVENTOR.
EINAR T. YOUNG
BY
Donald R. Johnson
ATTORNEY

United States Patent Office 3,404,569
Patented Oct. 8, 1968

3,404,569
FLOWMETER MOUNTING ARRANGEMENT
Einar T. Young, Newtown Square, Pa., assignor to Sun Oil Company, Philadelphia, Pa., a corporation of New Jersey
Filed June 3, 1966, Ser. No. 555,114
9 Claims. (Cl. 73—231)

ABSTRACT OF THE DISCLOSURE

An imperforate support is pivotally mounted within an opening in a pipe and is sealed around its edges to the wall defining this opening. The support can be rotated about its pivot by means of a handle located outside the pipe. A flowmeter, for measuring flow in the pipe, is journaled in bearings mounted on one of the two opposite faces of the support.

---

This invention relates to a flowmeter mounting arrangement, and more particularly to a novel arrangement for mounting a turbine-type flowmeter in a pipe line through which fluids can flow.

Turbine-type flowmeters have several well-known advantages over other types of flowmeters, for certain applications of flow measurement. However, during use of such flowmeters, they must occasionally be removed for maintenance purposes, such as cleaning or replacement of the rotor bearings. In pipelines which are in continuous operation, it has previously been necessary to provide by-passes, with valves, to enable removal of the meters for maintenance without shutting off the flow in the main line. Since such valved by-passes are expensive, this requirement has in the past curtailed the use of turbine-type flowmeters in lines which must be in continuous operation.

An object of this invention is to provide a novel flowmeter mounting arrangement.

Another object is to provide a flowmeter mounting arrangement which enables a flowmeter being operated in a continuous-flow line to be maintained without the use of a by-pass.

A further object is to provide a flowmeter mounting arrangement which enables maintenance of the flowmeter to be effected without the necessity of shutting off the flow of fluid in the line wherein the flowmeter is operating, or without interfering with such flow.

A further object is to provide an arrangement operable externally of a fluid-flow pipe for moving a flowmeter from an operating position to a maintenance position, and vice versa.

The objects of this invention are accomplished, briefly, in the following manner: a support having two opposite imperforate faces is positioned within an opening provided in the wall of a pipe, and is arranged for rotation, about an axis at right angles to the longitudinal axis of the pipe, by means of a shaft fastened to the support and extending to a point external of the pipe. Sealing means are provided to provide a seal between the edges of the support and the wall defining the opening. The rotor bearings for a turbine-type flowmeter are mounted on one face of the support, and a handle is secured to the shaft to facilitate manual rotation thereof. A domed cover is secured to the outside of the pipe, over the opening and over the rotatable support.

A detailed description of the invention follows, taken in conjunction with the accompanying drawings, wherein.

Figure 1:
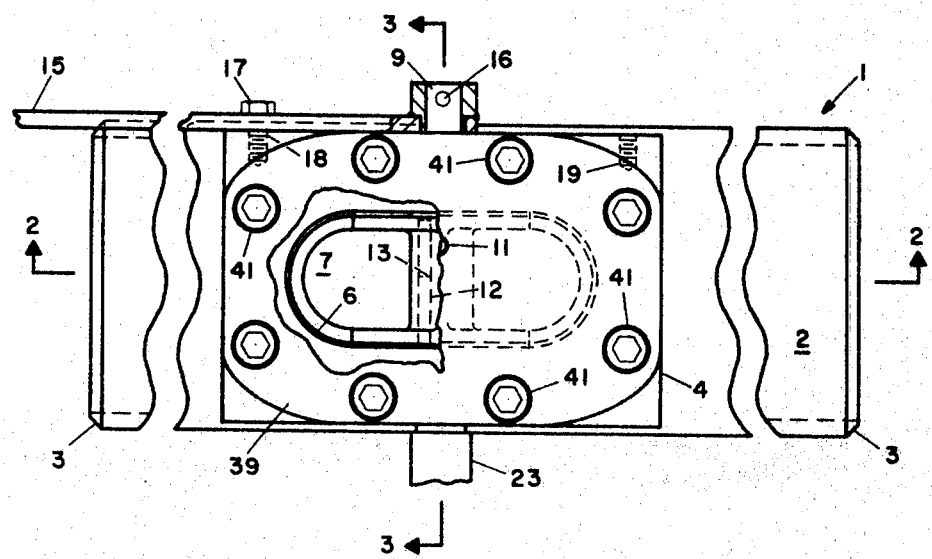
FIG. 1 is a plan (top) view of a flowmeter mounting arrangement according to this invention, certain portions thereof being broken away in order to show details.

The flowmeter assembly of this invention, which is denoted generally by numeral 1, is mounted on a piece of pipe 2 whose opposite ends are beveled at 3, for welding into a main line (not shown) wherein the fluid flow is to be measured. It is assumed that the main line is in continuous operation, and it is desired that the flowmeter be so arranged that it can be removed for maintenance without shutting off the flow in the main line; for obvious reasons, the assembly of this invention is termed an "in-line" flowmeter assembly.

A saddle member 4, of rectangular outer configuration, is welded into a rectangular opening 5 provided in the wall of pipe 2. The longer dimension of opening 5 is parallel to the longitudinal axis of pipe 2. The inner surface of saddle 4 (at its edges, around a central opening 6 which will be referred to further hereinafter) has a curvature which matches the curvature of the inner wall of pipe 2, as may be seen in FIGS. 2 and 3, and the outer surface of this saddle is planar. Saddle 4 has an elongate (oblong) central opening 6 therein, the two longer sides of this opening being straight and the two ends thereof being rounded (arcuate); an opening of this shape is generally termed "obround." A base member or support 7, having an outer "obround" configuration which matches that of opening 6, is positioned within said opening. Support 7 is made of a non-magnetic (paramagnetic) material such as stainless steel, and it has two opposite substantially imperforate faces. In the central region of the longer sides of the "obround" support 7, this support has a somewhat greater thickness than does the remainder of the support, and a bore 8 is drilled through this thickened region, this bore extending entirely through the shorter dimension of the support, in a direction at right angles to the longitudinal axis of pipe 2; bore 8 is isolated by the material of the support from the two imperforate faces previously referred to.

Support 7 is held in position within opening 6 mainly by means of a shaft 9 (made of a non-magnetic material such as stainless steel) which is mounted in bore 8. One end of shaft 9 is located approximately at the center of the length of bore 8 (i.e., approximately at the center of support 7), and the opposite end of this shaft extends through an aligned bore 10 formed in saddle 4, centrally of the length thereof and extending in a direction at right angles to the longer dimension of the saddle and to the longitudinal axis of pipe 2. A set screw 11, which threads into a tapped hole provided in one face of support 7 and whose inner end extends into a transverse hole in shaft 9, prevents longitudinal movement of shaft 9 relative to support 7.

Shaft 9, whose outer end extends beyond (i.e., to the outside of) saddle 4 (and also pipe 2), provides a means which is operable externally of pipe 2 for rotating support 7 about an axis (the longitudinal center line of the shaft) lying at right angles to the longitudinal axis of pipe 2 (and also, of course, to the normal direction of fluid flow in this pipe). In order to positively secure shaft 9 to support 7 for rotation of the latter by the former, a keyway 12 is cut into the wall of bore 8, for the entire length of this bore, and a key 13 is cemented in keyway 12, one end of key 13 being located at the approximate center of the length of bore 8 and this key extending in the direction of the length of shaft 9 (i.e., to the right of the vertical mid-plane in FIG. 3). A matching keyway (which may be seen in FIG. 2), for reception of key 13, is provided at the inner end of shaft 9.

A circumferential groove, for reception of an O-ring gasket 14, is provided in shaft 9, in the portion thereof which passes through bore 10, this O-ring providing a seal in bore 10 and preventing leakage of fluid around shaft 9, in bore 10.

For manually rotating shaft 9, and thereby also support 7, an operating handle 15 is pinned at 16 to the outer end of shaft 9. Handle 15 is rectangular in cross-section and extends at right angles to shaft 9; this handle rotates in a vertical plane which is parallel to the vertical plane passing through the longitudinal axis of pipe 2. Handle 15 is pinned to the outer end of shaft 9 and is located externally of saddle 4. It may be seen that by manually rotating the handle 15, shaft 9 and support 7 (keyed thereto) may be rotated from the "operating" position illustrated in the drawings through 180° (about the axis of shaft 9) to a "maintenance" position, and vice versa. The significance of the terms "operating" and "maintenance" will be explained hereinafter. In order to hold handle 15 in the position illustrated, a bolt 17 passes through a clearance hole in handle 15 and threads into a tapped hole 18 provided in saddle 4. Another tapped hole 19 is provided in saddle 4, on the opposite side of shaft 9 from hole 18, for reception of bolt 17; when handle 15 is in a position 180° from that illustrated, bolt 17 may be passed through handle 15 and threaded into hole 19, thereby to hold handle 15 in this other or 180° position.

A stub shaft 20 (FIG. 3), made of a ferromagnetic material such as mild steel, helps to hold support 7 in position within opening 6. Stub shaft 20 is mounted in bore 8. One end of shaft 20 is located approximately at the center of the length of bore 8 (abutting the inner end of shaft 9), and the opposite end of shaft 20 extends into an aligned bore 21 formed in saddle 4 opposite to and aligned with bore 10. The outer end of stub shaft 20 abuts a metal disc 22 (made for example of mild steel) closing the inner end of a nipple 23 which is threadedly mounted in the enlarged-diameter outer end of bore 21. In operation, nipple 23 contains a pickup coil (not shown) which forms electrical pulses as the rotor of the flowmeter of the invention rotates.

A circumferential groove, for reception of an O-ring gasket 24, is provided in shaft 20 near the outer end thereof, this O-ring providing a seal in bore 21 and preventing leaking of fluid around shaft 20, in bore 21.

A groove 25 which opens outwardly is provided entirely around the "obround" support 7, this groove communicating, at the center of one of the longer sides of the support, with a substantially circular groove 26 around shaft 9 and, at the center of the other of the longer sides of the support, with a similar substantially circular groove 27 (see FIG. 3) around stub shaft 20. An O-ring gasket 28 is contained in the "obround" groove 25, such that it follows about half of the groove 26 around shaft 9 and about half of the groove 27 around stub shaft 20. The O-ring 28 is so positioned that, in the "operating" position of support 7 illustrated, this O-ring lies in the "lower" portion of groove 26 ("below" shaft 9) and in the "lower" portion of groove 27 ("below" shaft 20); see FIG. 3. The O-ring 28 provides a seal in opening 6 and prevents leakage of fluid around support 7, in opening 6. In this connection, it will be recalled that the two opposite faces of support 7 are substantially imperforate.

Figure 2:
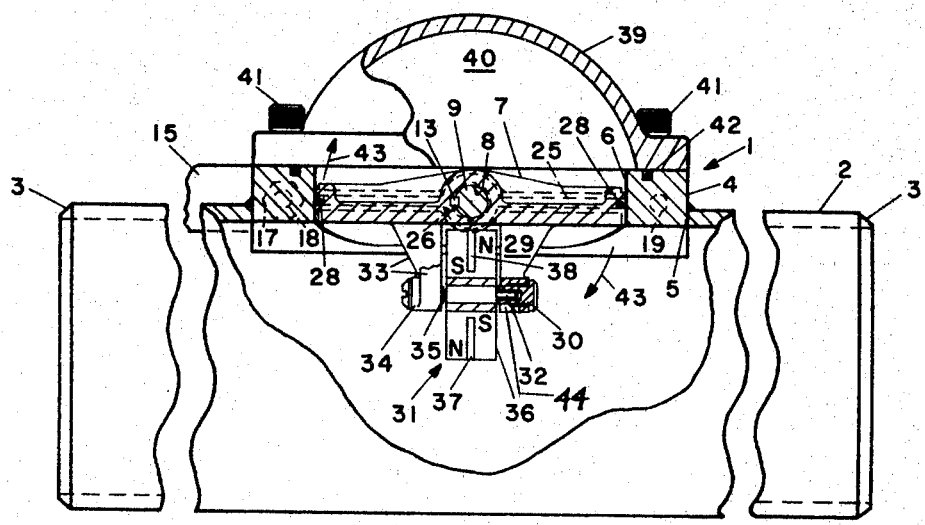
FIG. 2 is a vertical section taken on line 2—2 of FIG. 1 and looking in the direction of the arrows.
Figure 3:
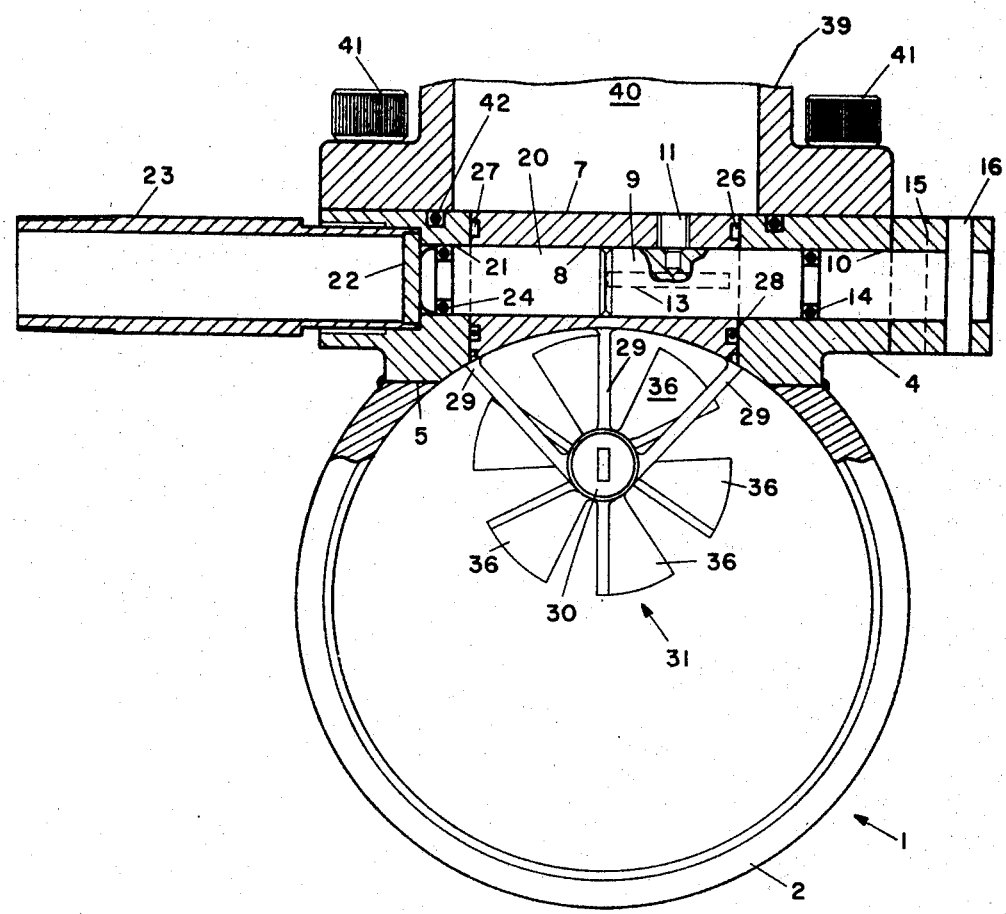
FIG. 3 is a section (on an enlarged scale) taken on line 3—3 of FIG. 1 and looking in the direction of the arrows.

The face of support 7 opposite to that through which set screw 11 extends has a curvature which matches that of the inner wall of pipe 2 (see FIG. 3). Extending outwardly away from this curved face of support 7, on one side (for example, the right-hand side in FIG. 2) of the vertical midplane passing through its longer sides, is a set of three angularly-spaced ribs 29 which converge in the direction proceeding away from the support face. Ribs 29 are integral with support 7 and their convergent ends are integral with a boss which is machined, thereby to provide a bushing in which is threadedly mounted a bearing holder 30; holder 30 carries an unnumbered bearing which is located at one side of the rotor 31 of a turbine-type flowmeter. An integral stub shaft 32 at one side of the flowmeter vanes is journaled for rotation in the aforementioned bearing. A similar set of ribs 33 on the opposite side of the vertical midplane of the support 7 mounts a similar fixed bearing holder 34 at the other side of flowmeter 31. An integral stub shaft 35 at said other side of the flowmeter vanes is journaled for rotation in the bearing carried by holder 34. By means of the mounting arrangement just described, the flowmeter rotor is rotatably mounted on the face of support 7 opposite to that through which set screw 11 extends (to wit, the bottom face in FIG. 2).

The flowmeter rotor 31 (see FIG. 3) comprises six curved, angularly-spaced turbine vanes 36 which extend in radial directions with respect to shafts 32 and 35. Two permanent magnets 37 and 38 are secured to two respective diametrically-opposite vanes of rotor 31 (see FIG. 2).

In the "operating" position of the flowmeter rotor illustrated particularly in FIGS. 2 and 3, the rotor 31 is rotated by the motion of the fluid in pipe 2, as a result of the action of the fluid on vanes 36. The movement of the rotor magnets 37 and 38 past the shaft 20 (made, as stated, of a ferromagnetic material such as mild steel, the support 7 being made of a non-magnetic material) causes magnetic pulses to be transmitted to the end of the coil (not shown) which is contained in nipple 23, thereby forming electrical pulses in the same manner as most turbine flowmeters.

A domed cover 39, of approximately "obround" outer configuration but with its ends somewhat flattened to match the straight ends of saddle 4, overlies the central opening 6 of saddle 4 and provides a chamber 40 between the lower (or inner) surface of the dome and support 7. Chamber 40 is of a size sufficient to accommodate therein the flowmeter 31. Cover 39 is flanged as its outer edge, and is secured to saddle 4 by means of a plurality of cap screws 41 which pass through clearance holes in the cover and thread into respective tapped holes in saddle 4. An "obround" groove is cut into the upper surface of saddle 4, outside of opening 6 and under cover 39; an O-ring gasket 42 is seated in this groove and functions to prevent leakage under the cover 39.

When maintenance of the flowmeter is necessary (e.g., cleaning or replacement of the bearings 30 and 34), screw 17 is removed from hole 18 and handle 15 is rotated 180°, thereby rotating support 7 about the axis of shaft 9 (e.g., in the direction of arrows 43 in FIG. 2) so that the rotor 31 and bearings 30, 34 are outside of pipe 2, and in the chamber 40 under cover 39. This is the "maintenance" position of the flowmeter rotor, and in this position O-ring 28 prevents leakage past support 7 into the chamber 40. During the said rotation of handle 15 the fluid in pipe 2 can continue to flow freely.

After the 180° rotation of handle 15, screw 17 is re-inserted through the handle and threaded into hole 19. This prevents accidental opening of the pipe 2 while working on the meter parts.

Cover 39 is then removed. This exposes the rotor 31 and its bearings 30, 34, which are now outside of pipe 2, for maintenance operations as necessary. The fluid in pipe 2 can continue to flow freely during the entire maintenance operation. It is not necessary to shut off the flow in this pipe; for maintenance, there is no interference with the flow. No expensive by-pass and valves are required.

A longitudinally-extending slot 44 is provided in each of the bearing bushings formed on the respective ribs 29 and 33, each of these slots being slightly longer than the respective stub shafts 32 and 35. Slots 44 are located at the bottoms of the ribs when the flowmeter is in the operative position of FIG. 2; when the handle 15 has been rotated 180° to the "maintenance" position, these slots would of course be above the ribs 29, 33. When the flowmeter rotor is in the "maintenance" position, bearing holders 30 and 34 may be unscrewed and removed to remove the bearings; after this has been done, the rotor unit may be lifted out of its supports via slots 44 if desired. The slots 44 allow for passage therethrough of the stub shafts 32 and 35 when the rotor unit (vane-and-shaft assembly) is so removed from its supports.

As previously stated, pipe 2 is welded at 3 into a main pipeline, whereas prior practice has required that a flanged-and-bolted connection be used between the flowmeter assembly and the main line (employing, of course, a by-pass during the maintenance operation). Welding of the flowmeter assembly in position provides several advantages, as compared to flanging. In the first place, welding is less expensive than flanging. In the second place, since the flowmeter assembly of this invention remains welded in position during maintenance, mismatches at the flanges (which could easily occur when flanged assemblies are taken out of the main line for maintenance) are avoided. The flowmeter assembly of this invention can remain welded in the main line even when major maintenance (e.g., replacement of gasket 28) is required (although in this case, of course, the flow in the main line would have to be shut off).

The invention claimed is:

1. In combination with a pipe through which fluid can flow, an imperforate support positioned within an opening in the wall of said pipe and mounted for rotation with respect thereto, said support being rotatable from an operating position to a maintenance position, and vice versa; means acting to provide a seal between said support and the wall defining said opening, in each of the said positions of said support; a device, responsive to a measurable physical characteristic associated with the fluid in said pipe, secured to said support in such a manner that in said operating position said device is located within said pipe and is coupled to the fluid therein, and in said maintenance position said device is located outside said pipe and is isolated from said fluid; and means operable externally of said pipe for rotating said support back and forth between its two said positions.

2. In combination with a pipe through which fluid can flow longitudinally, a support positioned within an opening in the pipe wall and having two opposite imperforate faces; means acting to provide a seal between said support and the wall defining said opening; said support being movable between two positions in one of which a first only of said faces is exposed to the interior of said pipe and in the other of which the second only of said faces is exposed to the interior of said pipe; a device, responsive to a measurable physical characteristic associated with the fluid in said pipe, secured to one face of said support, and means operable externally of said pipe for moving said support back and forth between its two positions.

3. Combination set forth in claim 2, wherein said device is a flowmeter responsive to the flow rate of fluid which flows in said pipe.

4. Combination set forth in claim 2, wherein said device is a turbine-type flowmeter the rotor of which is journaled in bearings mounted on said one face of said support.

5. Combination set forth in claim 2, wherein said last-mentioned means includes a manually-rotatable shaft fastened to said support and extending to a point external of said pipe.

6. Combination set forth in claim 2, wherein said support is rotatable about an axis lying at right angles to the longitudinal axis of said pipe.

7. Combination defined in claim 6, wherein said device is a flowmeter responsive to the flow rate of fluid which flows in said pipe.

8. Combination in accordance with claim 7, wherein said flowmeter is a turbine-type meter the rotor of which is journaled in bearings mounted on said one face of said support.

9. Combination in accordance with claim 8, wherein said last-mentioned means includes a manually-rotatable shaft fastened to said support and extending to a point external of said pipe.

References Cited

UNITED STATES PATENTS

| 935,129 | 9/1909 | Speed et al. | 73—231 |
| 2,585,290 | 2/1952 | Walker | 73—211 |
| 3,304,780 | 2/1967 | Lee et al. | 73—231 |
| 3,340,733 | 9/1967 | Lasher | 73—228 |

FOREIGN PATENTS

| 15,667 | 7/1913 | Great Britain. |
| 1,332,419 | 6/1963 | France. |

RICHARD C. QUEISSER, *Primary Examiner.*

EDWARD D. GILHOOLY, *Assistant Examiner.*